US012094148B2

United States Patent
Kim et al.

(10) Patent No.: US 12,094,148 B2
(45) Date of Patent: Sep. 17, 2024

(54) METHOD FOR DETECTING FOG PARTICLES AND CALCULATING FOG CHARACTERISTICS BASED ON CAMERA IMAGES

(71) Applicant: National Institute of Meteorological Sciences, Seogwipo-si (KR)

(72) Inventors: Bu-Yo Kim, Seogwipo-si (KR); Miloslav Belorid, Seogwipo-si (KR); Joo Wan Cha, Seogwipo-si (KR)

(73) Assignee: NATIONAL INSTITUTE OF METEOROLOGICAL SCIENCES, Seogwipo-si (KR)

( * ) Notice: Subject to any disclaimer, the term of this patent is extended or adjusted under 35 U.S.C. 154(b) by 56 days.

(21) Appl. No.: 18/178,305

(22) Filed: Mar. 3, 2023

(65) Prior Publication Data

US 2024/0119617 A1    Apr. 11, 2024

(30) Foreign Application Priority Data

Oct. 6, 2022 (KR) .......... 10-2022-0127480

(51) Int. Cl.
| | |
|---|---|
| *G06T 7/62* | (2017.01) |
| *G06T 5/20* | (2006.01) |
| *G06T 5/70* | (2024.01) |
| *G06V 10/28* | (2022.01) |
| *G06V 10/764* | (2022.01) |
| *H04N 1/40* | (2006.01) |
| *H04N 23/69* | (2023.01) |

(52) U.S. Cl.
CPC ............ *G06T 7/62* (2017.01); *G06T 5/20* (2013.01); *G06T 5/70* (2024.01); *G06V 10/28* (2022.01); *G06V 10/764* (2022.01); *H04N 1/40012* (2013.01); *H04N 23/69* (2023.01); *G06T 2207/30242* (2013.01); *G06V 2201/07* (2022.01)

(58) Field of Classification Search
CPC .... G06T 7/62; G06T 5/20; G06T 5/70; G06T 2207/30242; G06V 10/28; G06V 10/764; G06V 2201/07; G06V 10/56; G06V 20/60; H04N 1/40012; H04N 23/69
See application file for complete search history.

(56) References Cited

U.S. PATENT DOCUMENTS

| | | | |
|---|---|---|---|
| 2007/0031006 A1* | 2/2007 | Leleve ............... | G06T 7/66 382/104 |
| 2011/0135200 A1* | 6/2011 | Chen ................. | G06T 5/73 382/167 |
| 2016/0247273 A1* | 8/2016 | Fallgatter ........... | G06F 18/24 |
| 2020/0257020 A1* | 8/2020 | Spatzierer ......... | G01W 1/02 |

FOREIGN PATENT DOCUMENTS

| | | |
|---|---|---|
| KR | 10-1814050 B1 | 3/2017 |
| KR | 10-1880850 B1 | 7/2018 |
| KR | 10-2021-0026439 A | 3/2021 |

* cited by examiner

*Primary Examiner* — Michael E Teitelbaum
(74) *Attorney, Agent, or Firm* — NKL Law; Jae Youn Kim

(57) ABSTRACT

Provided is a method for detecting fog droplets and calculating fog characteristics based on camera images, which can set a digital camera and an optical lens at magnification capable of identifying fog droplets, thereby detecting fog droplets from photographed images and calculating various characteristics related to fog.

5 Claims, 11 Drawing Sheets

METHOD FOR DETECTING FOG PARTICLES AND CALCULATING FOG CHARACTERISTICS BASED ON CAMERA IMAGES

BACKGROUND OF THE INVENTION

Field of the Invention

The present invention relates to a method for detecting fog droplets and calculating fog characteristics based on camera images, and more specifically, a method for detecting fog droplets and calculating fog characteristics based on camera images, which can set a digital camera and an optical lens at magnification capable of identifying fog droplets, thereby detecting fog droplets from photographed images and calculating various characteristics related to fog.

BACKGROUND ART

World meteorological organization (WMO) defines the meteorological phenomenon in which horizontal visibility is less than 1 km by droplets in the air as fog. Such fog threatens the safety of road, sea, and air traffic, and has potential risk factors that cause physical and human damages.

Therefore, it is very important to detect and monitor fog and analyze characteristics of the fog, such as number concentration, liquid water content, fog duration, and so on, in accident black spots in which a frequency of fog occurrence is high and accidents caused by fog occur frequently.

However, existing observation devices (e.g., DMT's FM-120) used in order to observe fog and analyze fog characteristics are expensive equipment reaching from several tens of million won to several hundreds of million won, and have some disadvantages in that it is difficult to prepare an installation space for the equipment and in that it is not easy to maintain.

On the other hand, as a result of investigating conventional arts related to the present invention, a number of patent literatures were searched, and some of them are introduced as follows.

Patent literature 1 discloses a system for detecting fog and fine particles using multiple frequencies comprising: an antenna for transmitting a dual polarization and receiving a signal reflected by colliding with a target; a signal processing unit for converting the received signal into a meteorological variable for measuring fog and fine particles; and a signal generation unit for generating a double polarization for each of multiple frequencies of a band K and a band W whenever the observation time arrives, and transmitting the double polarization through an antenna. The system for detecting fog and fine particles can sequentially perform multiple zone observations including a single zone observation to process an observation target zone with one grid, an individual zone observation, an overlapping zone observation, or a combination thereof to process an observation target zone with a plurality of grids according to a predetermined setting to generate and output observation data, extract correlation between neighboring observation zones by performing a convolution of the observation data of the multiple zone observations, reduce an observation error of the observation zone for each grid set in the single zone observation and the multiple zone observation based on the correlation. When observation of fog and fine particles is performed by applying multiple frequencies of K band and W band to a dual polarized weather radar, observation of fog and fine particles is performed by using a single zone observation method and a multi zone observation method in combination. Thus, the accuracy of observations can be increased, observation errors at specific spots can be prevented, and observation of fog and fine particles including a total amount, a particle size, distribution, density, a developmental process, the direction of movement, or a combination thereof can be performed.

Patent literature 2 discloses a method and a system for detecting fog using temporal filtering and correlation of saturation and value in a road driving image. The method for detecting fog comprises: a step of setting an area of a predetermined distance or greater in an interest area based on a vanishing point in a road driving image obtained; a step of detecting fog by calculating the ratio of a saturation (S) channel and a value (V) channel on the determined interest area; and a step of applying temporal filtering using information on the ratio of the saturation (S) channel and the value (V) channel of adjacent frames. The method and system for detecting fog using temporal filtering and correlation of saturation and value in a road driving image can detect fog using images obtained from a camera installed in front of a vehicle running on a road and remove outliers through temporal filtering and accumulation, thereby obtaining a result of a stronger fog detection.

Patent literature 3 discloses a real-time fog detection algorithm using an image of an image sensor and a color temperature control street light device, which detect environmental information such as fog, smog, bad weather, or the like using real-time images using images of an image sensor, and based on the detected data, control the color temperature of a light emitting diode (LED) lighting from 3000 to 4000 k warm color temperature and 4000 to 7000 k cold color temperature through SMPS control of street lighting fixtures, thereby increasing the drivers visibility and saving energy.

PATENT LITERATURE

Patent Documents

Patent Document 1: Korean Patent No. 10-1814050 B1
Patent Document 2: Korean Patent No. 10-1880850 B1
Patent Document 3: Korean Patent Publication No. 10-2021-0026439 A

SUMMARY OF THE INVENTION

Accordingly, the present invention has been made to solve the above-mentioned problems occurring in the prior arts, and it is an object of the present invention to provide a method for detecting fog particles and calculating fog characteristics based on camera images, which can set a digital camera and an optical lens at magnification capable of identifying fog particles, thereby detecting fog particles from photographed images and calculating various characteristics related to fog.

To accomplish the above object, according to the present invention, a method for detecting fog particles and calculating fog characteristics based on camera images is provided and the method for droplets and calculating fog characteristics includes: a fog image collecting step of adjusting a magnification of a camera and an optical lens to a magnification capable of photographing fog, photographing fog, and storing a photographed image; an image conversion step of converting the photographed image into a single color image of a gray scale having the brightness of 0 to 255 and calculating the frequency by each brightness in the gray scale image; an image binarization step is a step of classifying and storing pixels based on a threshold to distinguish the fog droplets from the background in the image; an image pixel filtering and masking step is a step of specifying fog droplets by removing noise in the image which may occur in the binarization step and masking the pixels within the optimum radius based on a specific pixel; a fog droplet detecting step of detecting fog droplets using masked pixels; a step of calculating the size and the number of fog droplets of calculating the radius of the detected fog droplets and the number of fog droplets by each fog droplet size; and a step of calculating fog characteristics and generating an image is a step of calculating fog characteristics including a mean radius, an effective radius, a number concentration, an extinction coefficient, visibility by fog, and the like by using the calculated size and number of fog droplets, and generating fog characteristics into time series images whenever fog droplets are observed.

Moreover, when $r_i$ is a radius of each bin per fog droplet and $n_i$ is the number of droplets of each bin per fog droplet, the effective radius is calculated by an equation:

$$\text{effective radius} = \frac{\sum_{i=1}^{N} n_i r_i^3}{\sum_{i=1}^{N} n_i r_i^2}.$$

Furthermore, when $n_i$ is the number of droplets of each bin per fog droplet and V is a volume of a focus, the number concentration ($c_i$) per bin is calculated by an equation:

$$c_i = \frac{n_i}{V}.$$

and the liquid water content (LWC) is calculated by an equation:

$$LWC = \rho \sum_{i=1}^{N} \left(\frac{\pi}{6} c_i r_i^3\right).$$

Additionally, when $\alpha$ and $\beta$ are empirical coefficients according to the fog characteristics, and have values of $65 \leq \alpha \leq 178$ and $0.63 \leq \beta \leq 0.96$, the extinction coefficient ($\sigma_{ext}$) among the fog characteristics is calculated by an equation: $\sigma_{ext} = \alpha \times LWC^{-\beta}$.

In addition, the visibility (Vis) by fog is calculated by an equation:

$$Vis = \frac{-\ln(0.05)}{\sigma_{ext}}.$$

The method for detecting fog particles and calculating fog characteristics based on camera images according to the present invention can covert and binarize an image photographed by the digital camera into a single color image of a gray scale, detect fog droplets by filtering and masking the binarized image, calculate the size and the number of the fog droplets, and calculate various characteristics related with fog based on the calculated result. Therefore, at low costs, the fog characteristics whenever fog droplets are observed can be generated as time series images. Therefore, the present invention can identify fog characteristics in real time, and provide weather condition information and relevant services in real time.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, a method for detecting fog droplets and calculating fog characteristics based on camera images according to the present invention will be described with reference to the accompanying drawings.

Terms to be used in the present invention are defined in consideration of the functions of the present invention, and may differ depending on the intentions of a user or an operator or custom. Accordingly, such wordings should be defined on the basis of the contents of the overall specification.

In addition, the embodiment disclosed hereinafter does not limit the scope of the present invention, but corresponds to merely exemplary terms of constituent elements presented in claims of the present invention, and the embodiments that include replaceable constituent elements as equivalents of the constituent elements defined in the overall specification and claims may be included in the scope of the present invention.

Additionally, optional terms in the following embodiments are used to distinguish one component from another component, and the components are not limited by the terms.

Therefore, in describing the present invention, detailed description of related known technologies that may unnecessarily obscure the gist of the present invention will be omitted.

Figure 1:
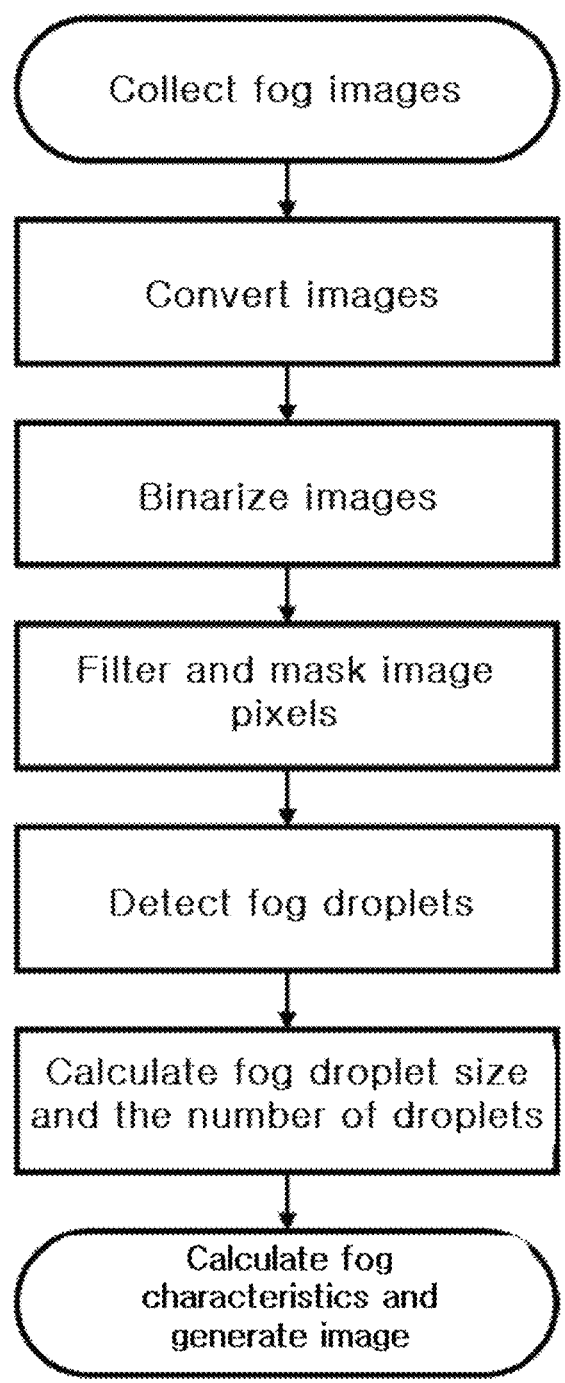
FIG. 1 is a flow chart illustrating a method for detecting fog droplets and calculating fog characteristics based on camera images according to the present invention.
Figure 2:
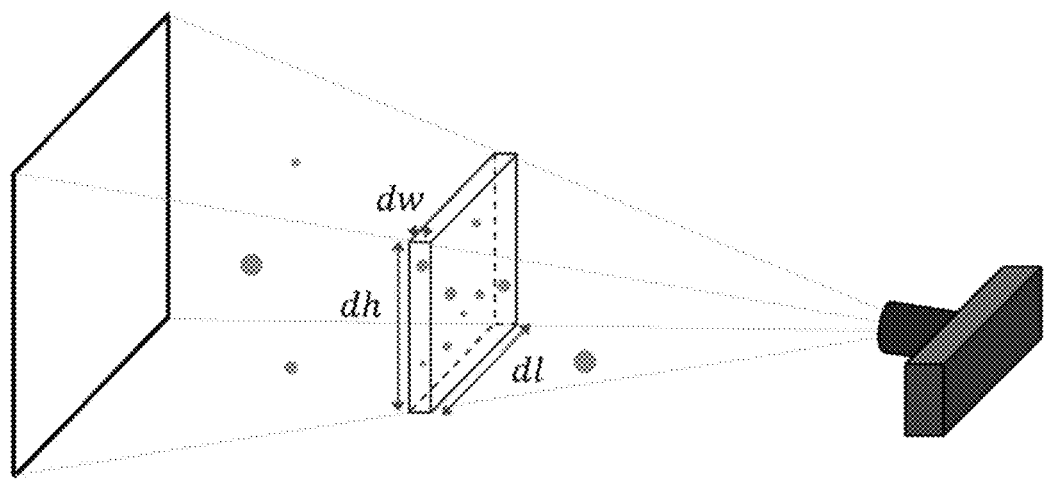
FIG. 2 is a mimetic diagram showing a fog droplet photographing method in a focus using a digital camera and an optical lens.
Figure 3A:
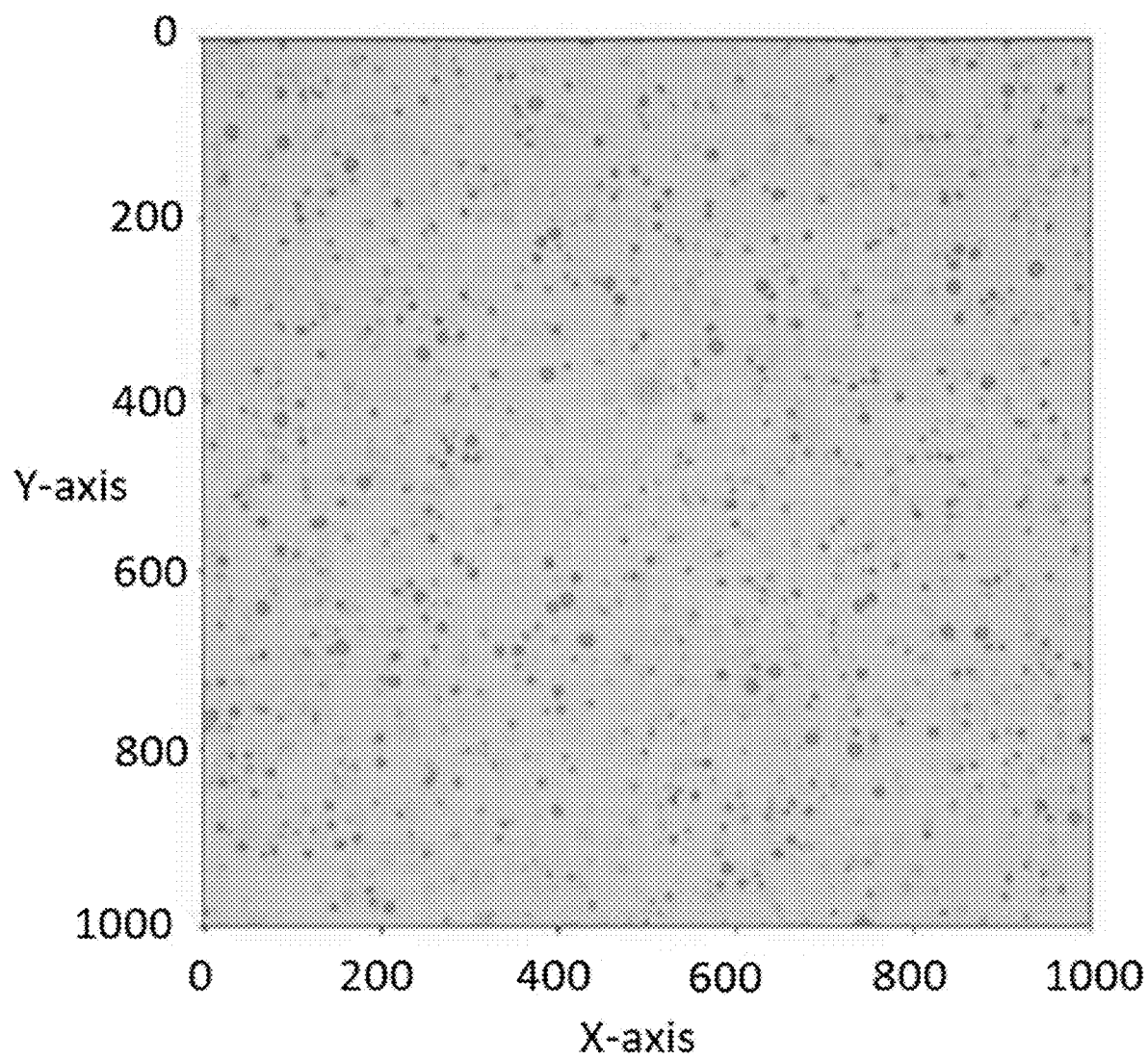
FIGS. 3A-3D are reference drawings showing images generated at each mid-process in the method for detecting fog droplets and calculating fog characteristics based on camera images according to the present invention.
Figure 3B:
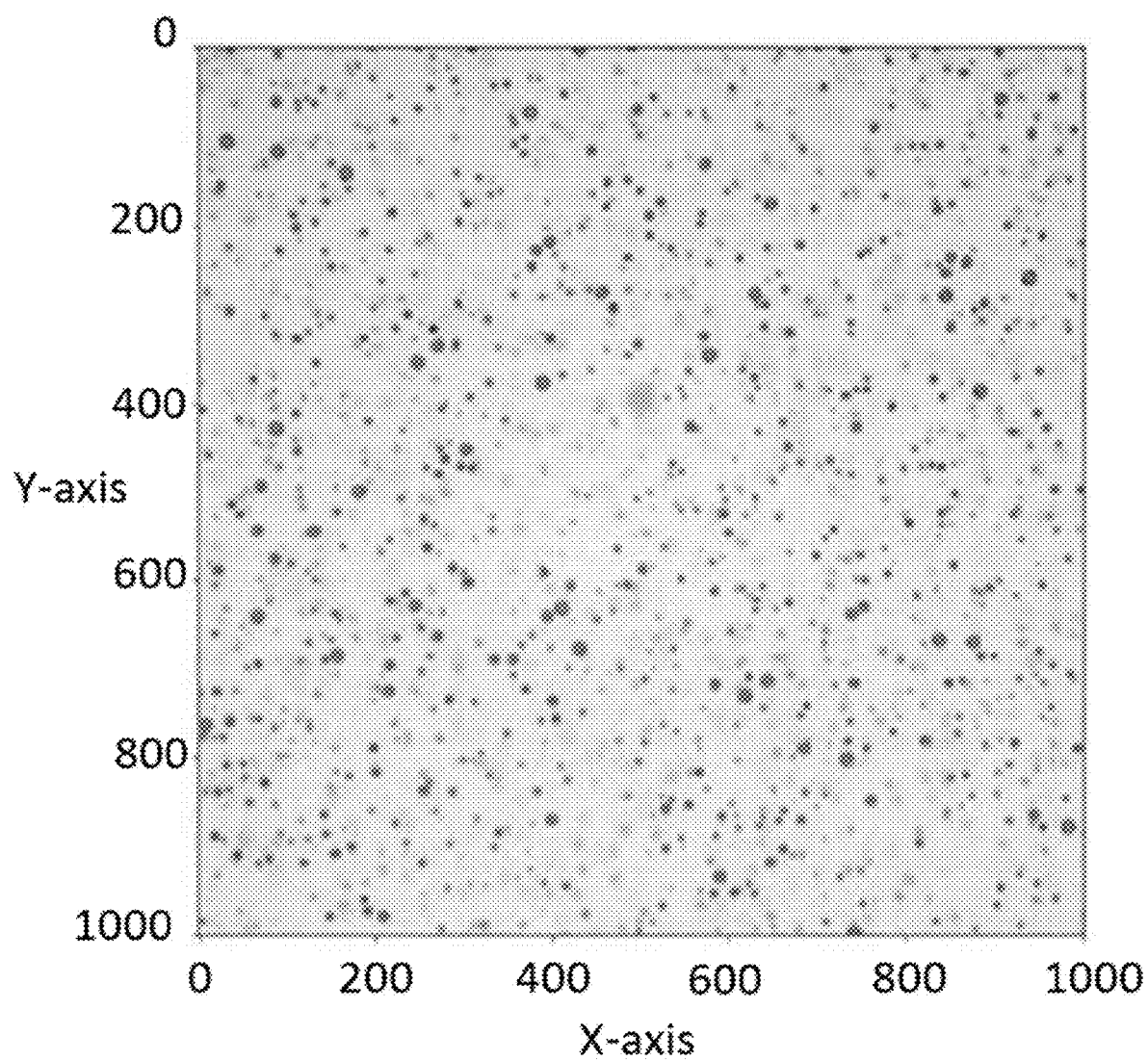
Figure 3C:
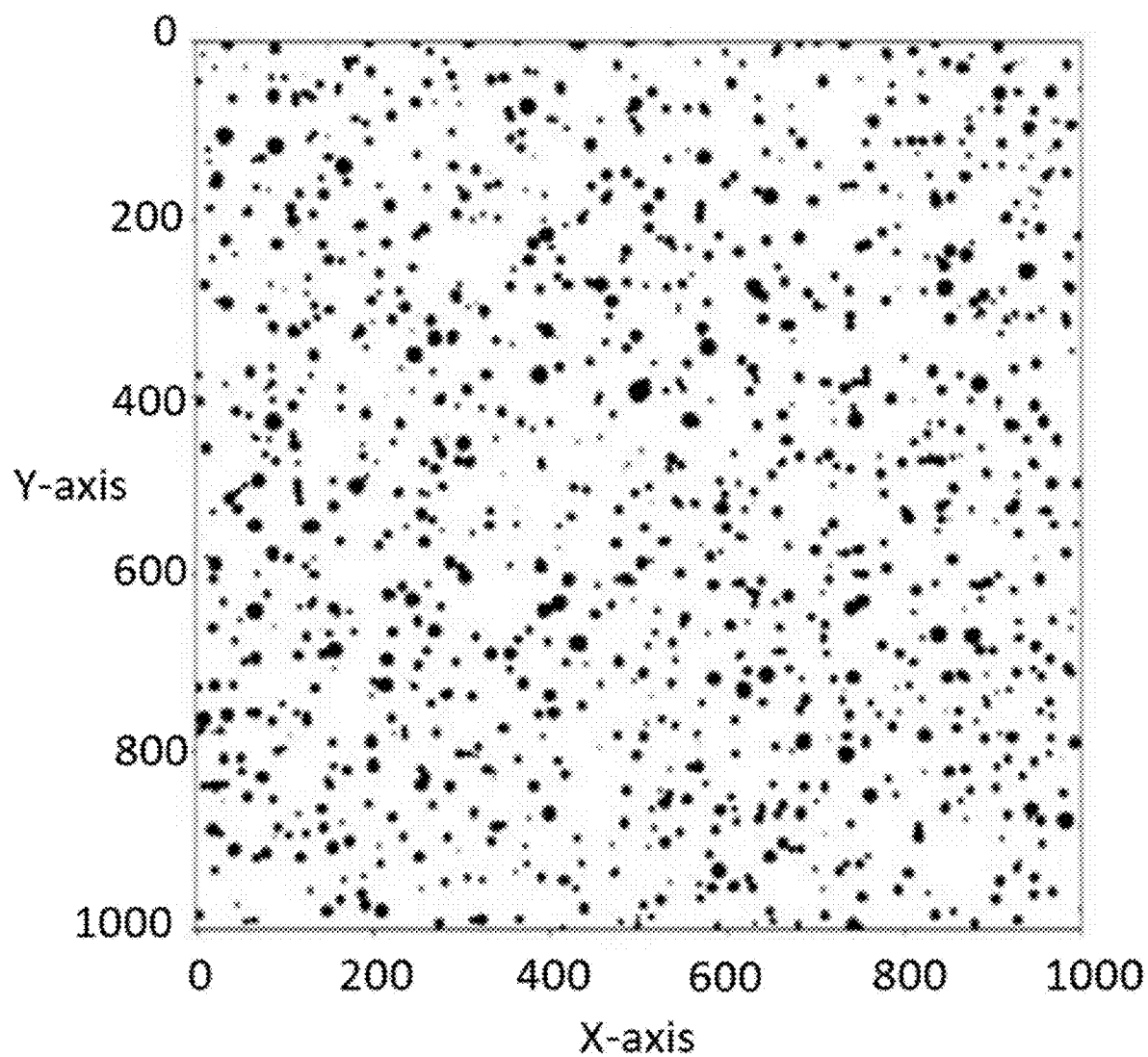
Figure 3D:
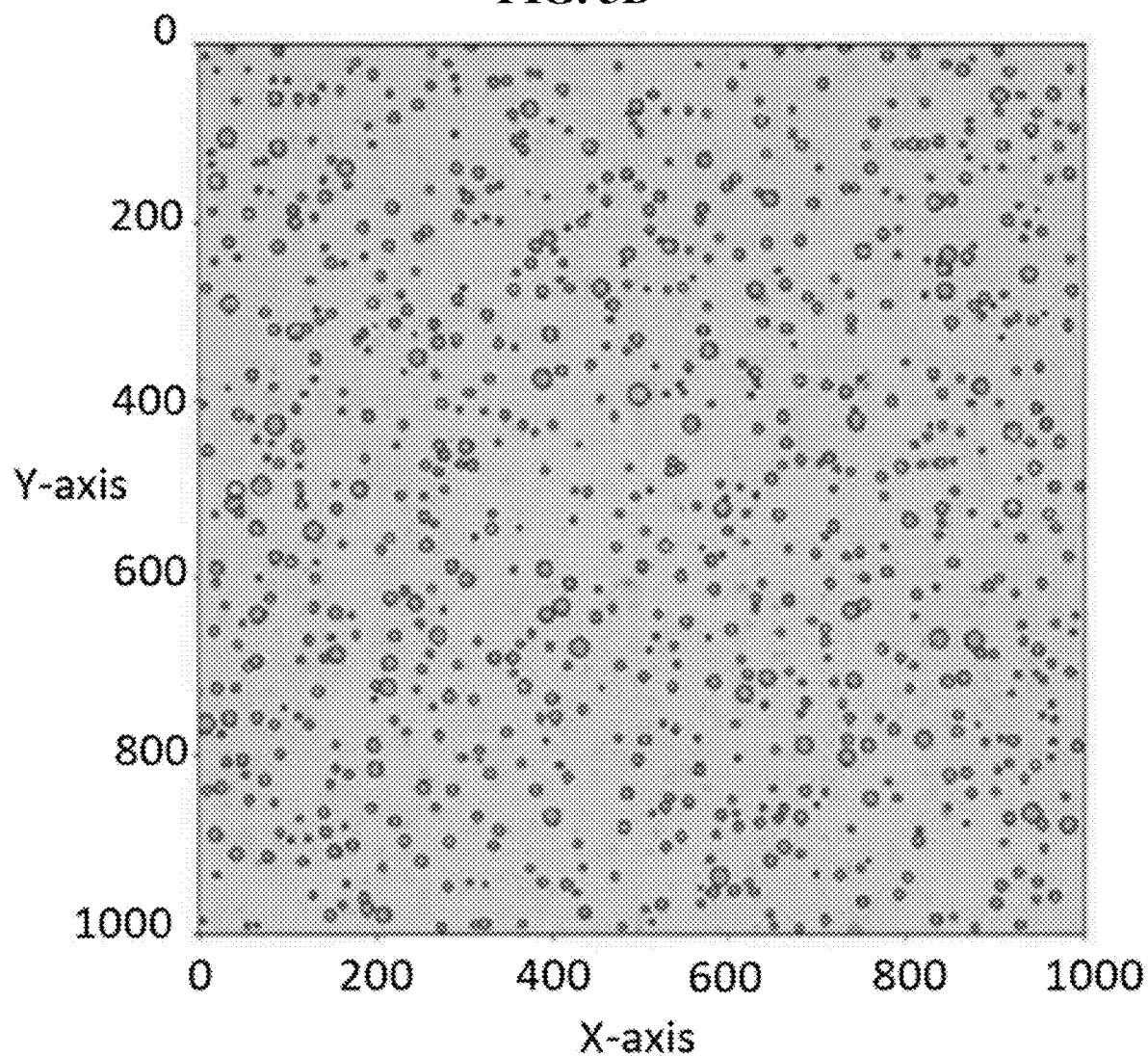
Figure 4:
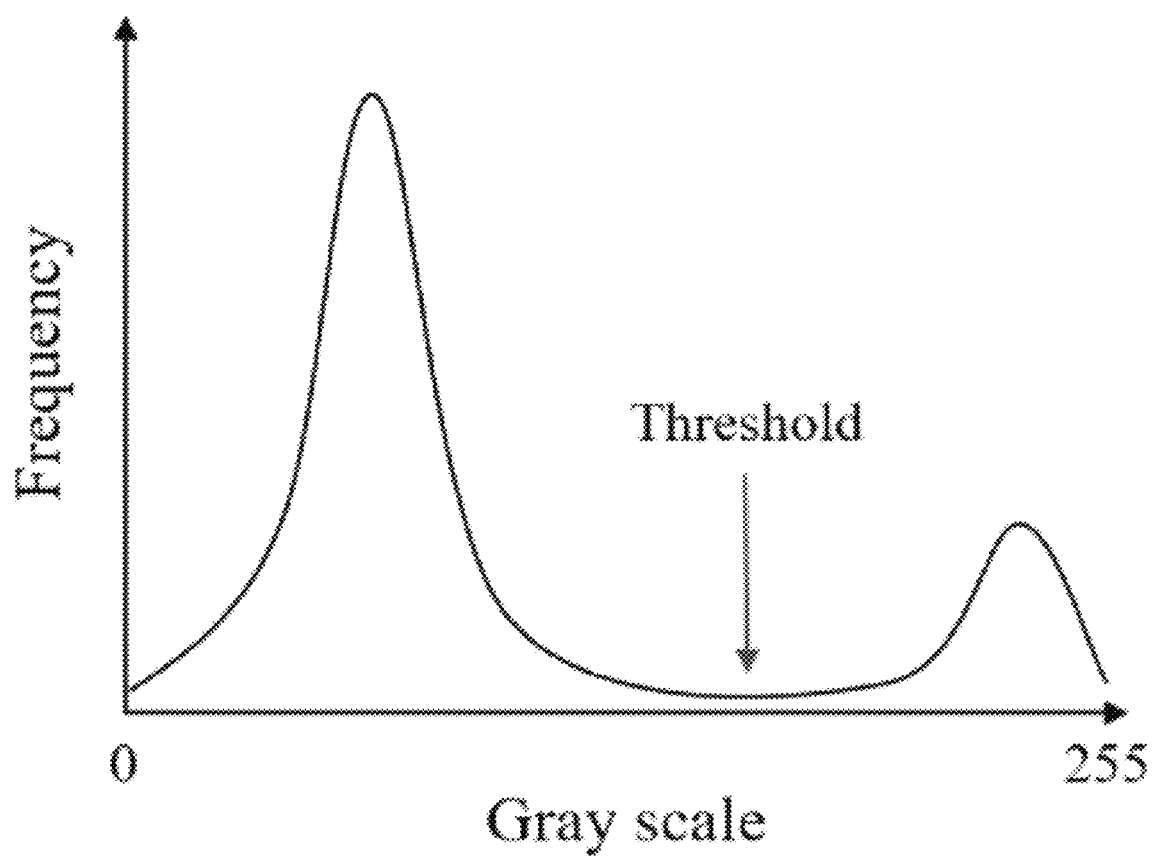
FIG. 4 is a graph showing the frequency by brightness of an image converted into a gray scale in the method for detecting fog droplets and calculating fog characteristics based on camera images according to the present invention.
Figure 5A:
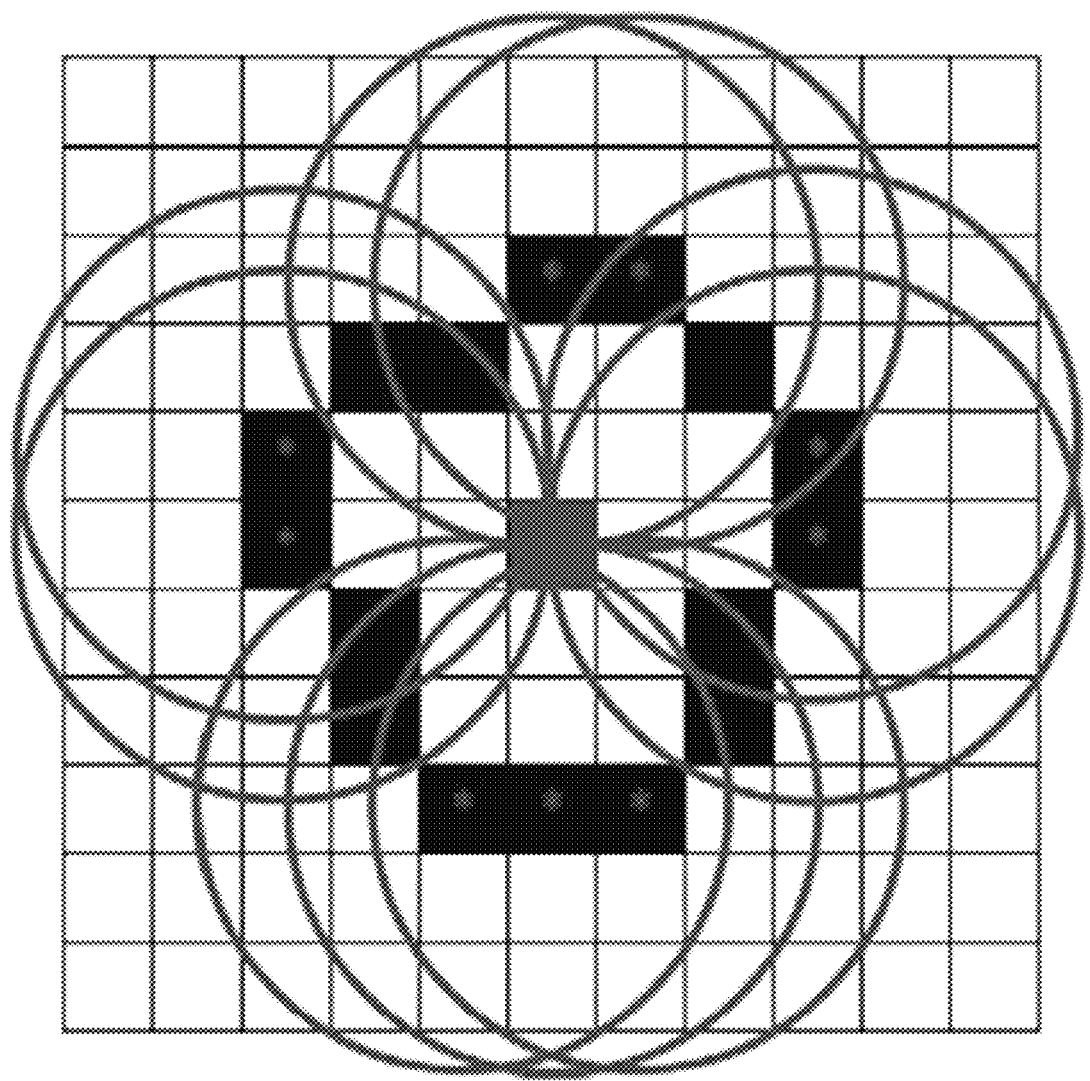
FIGS. 5A-5C are mimetic diagrams illustrating a process of determining the center and the radius of a fog droplet, and masking an object using a hough circle method.
Figure 5B:
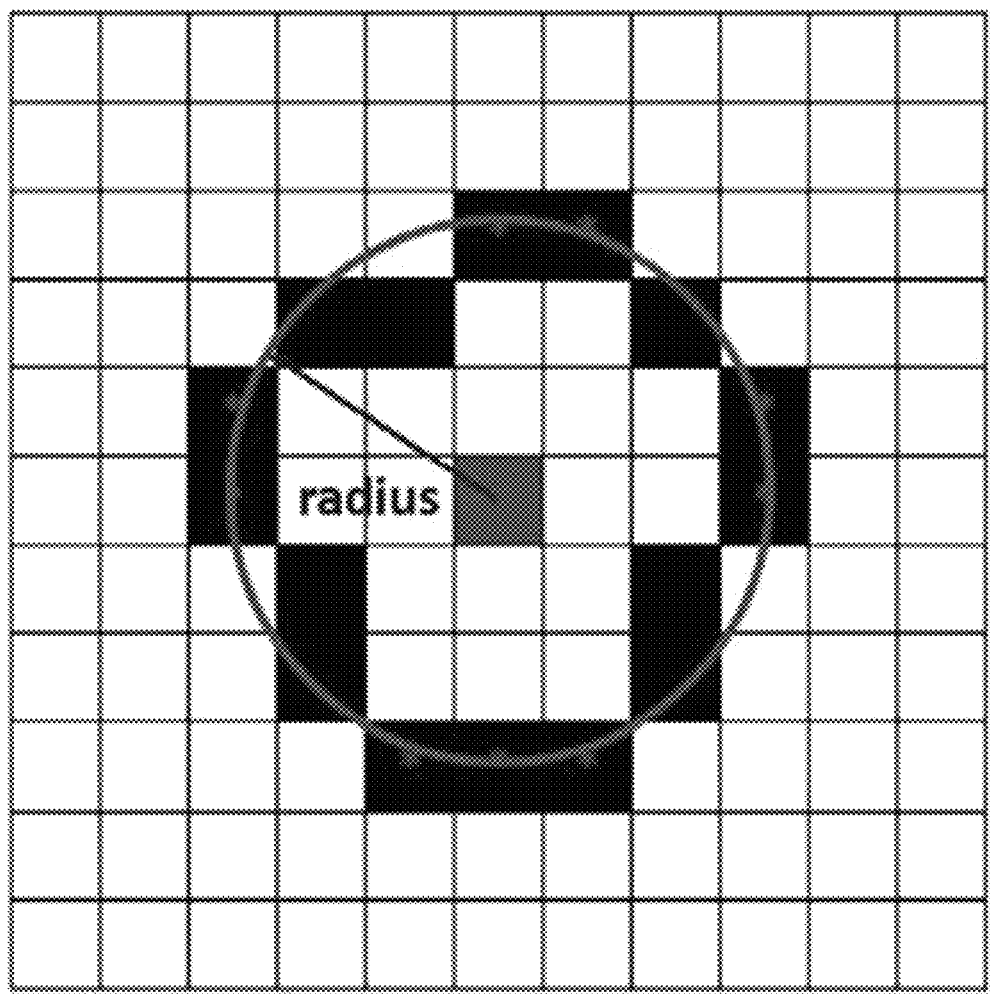
Figure 5C:
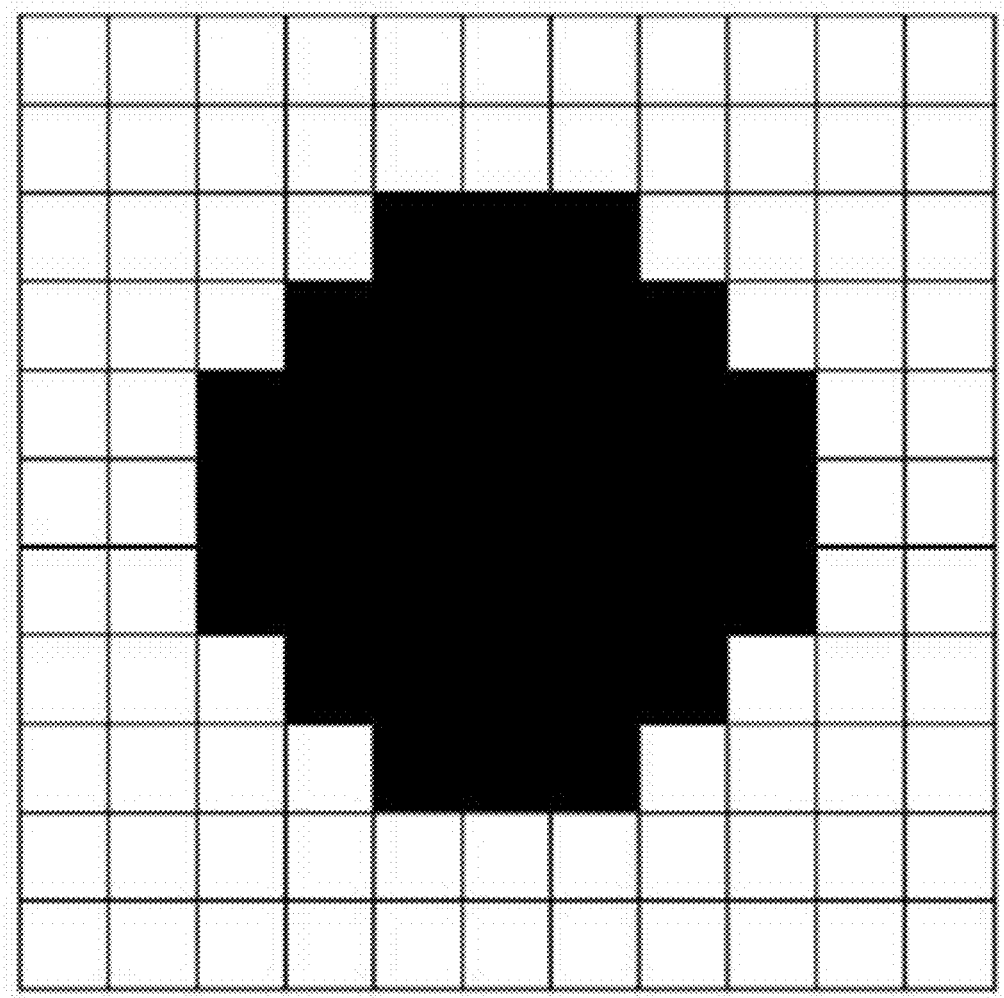
Figure 6:
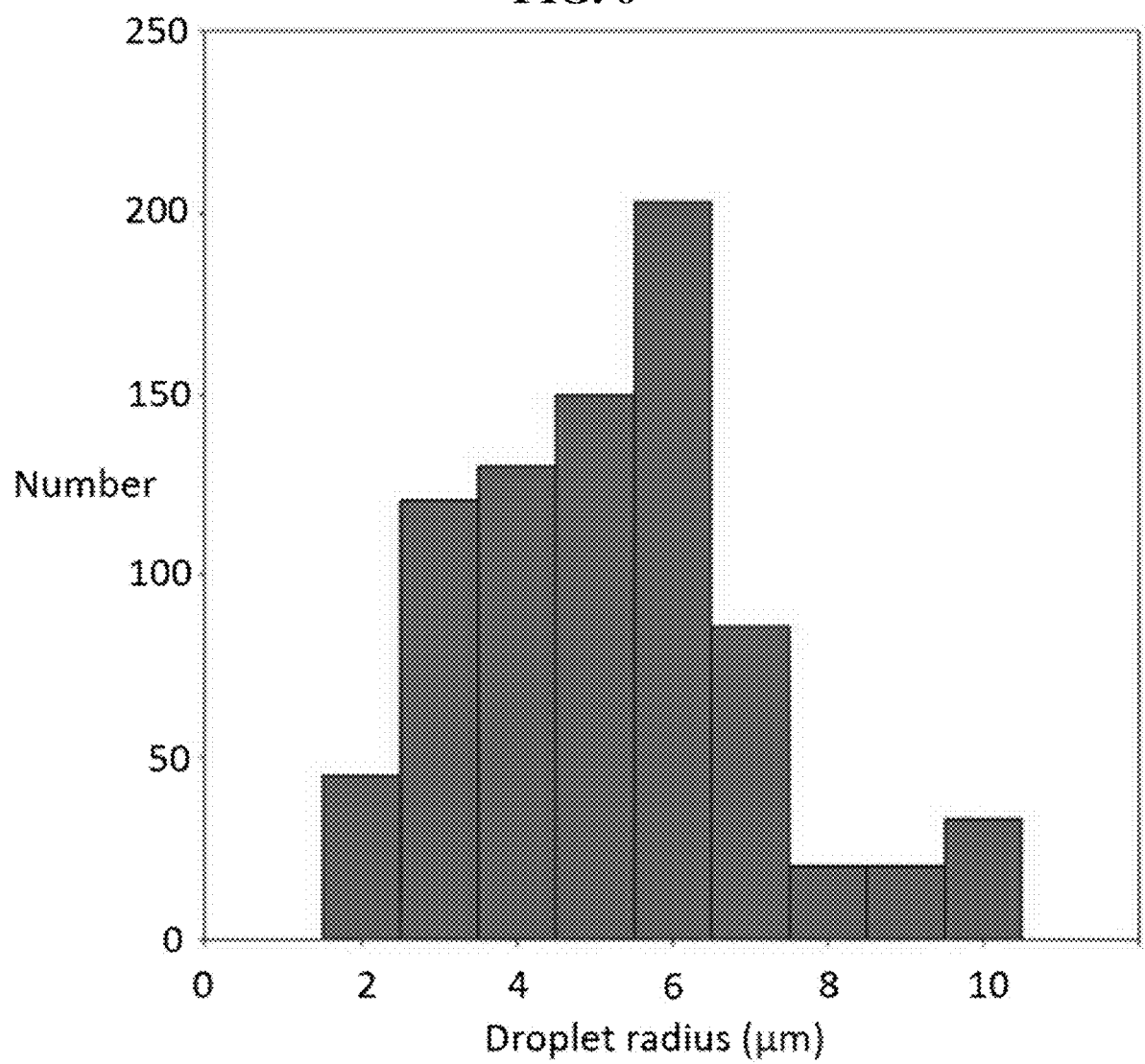
FIG. 6 is a graph showing the number of droplets of each bin by a fog droplet size in the method for detecting fog droplets and calculating fog characteristics based on camera images according to the present invention.

FIG. 1 is a flow chart illustrating a method for detecting fog droplets and calculating fog characteristics based on camera images according to the present invention, FIG. 2 is a mimetic diagram showing a fog droplet photographing method in a focus using a digital camera and an optical lens, FIG. 3A-3D are reference drawings showing images generated at each mid-process in the method for detecting fog droplets and calculating fog characteristics based on camera images according to the present invention, FIG. 4 is a graph showing the frequency by brightness of an image converted into a gray scale in the method for detecting fog droplets and calculating fog characteristics based on camera images according to the present invention, FIG. 5A-5C are mimetic diagrams illustrating a process of determining the center and the radius of a fog droplet, and masking an object using a hough circle method, and FIG. 6 is a graph showing the number of droplets of each bin by a fog droplet size in the method for detecting fog droplets and calculating fog characteristics based on camera images according to the present invention.

As illustrated in FIG. 1, the method for detecting fog droplets and calculating fog characteristics based on camera images according to the present invention includes: a fog image collecting step, an image converting step, an image binarization step, an image pixel filtering and masking step, a fog droplet detecting step, a step of calculating a fog droplet size and the number of fog droplets, and a step of calculating fog characteristics.

The fog image collecting step is a step of adjusting a magnification of a camera and an optical lens to a magnification capable of photographing fog, photographing fog, and storing a photographed image. That is, a camera equipped with an optical lens and a background light are installed in an area where fog often occurs, and the installed camera and the optical lens are adjusted to a magnification capable of photographing fog. In this instance, the magnification is set to be several to several tens of times according to the performance of the camera and optical lens, so that fog droplets within a size of 1 to 100 μm can be photographed.

The background light is a light installed to substitute a background located behind a focus to photograph fog droplets. The light source produces short impulses of light to less than 1 microsecond to freeze the moving droplets in the image. The shutter speed should be also set value as small as possible. This will allow the camera to capture the fast-moving fog droplets in sharp detail. The camera has an automatic shutter function to automatically photograph and store images, and such images are transmitted and stored into a central storage device, such as a server, through wireless communication, such as Wi-Fi and Bluetooth.

Meanwhile, FIG. 2 is a mimetic diagram illustrating a state in which fog droplets are photographed by a camera. In detail, in a case in which the magnification of the camera and the optical lens is adjusted, fog droplets may be photographed within a focused area. In this instance, there is a distance from several centimeters to several tens of centimeters between the camera and the field of view depending on the magnification, and the focus is located therebetween. Here, the field of view means the background placed behind the focus, and the background light may be located.

That is, the background light is installed to photograph fog droplets more clearly. In this case, since fog droplets which are not focused are not photographed, they are not shown on an image or are shown faintly.

The image conversion step is a step of converting the photographed image into a single color image of a gray scale having the brightness of 0 to 255 and calculating the frequency by each brightness in the gray scale image. In general, an image photographed by the camera is an image of a true color in which RGB (red, green, and blue) and brightness are mixed for each pixel as illustrated in FIG. 3A. In this case, since too much color information is included, it is difficult to distinguish fog droplets from the background which is not the fog droplets.

Therefore, in order to distinguish fog droplets from the background, the image of the true color is converted into a single color image of the gray scale having the brightness of 0 to 255 as illustrated in FIG. 3B. At the same time, the frequency by each brightness of the gray scale image in images to be used for image binarization is calculated.

The image binarization step is a step of classifying and storing pixels based on a threshold to distinguish the fog droplets from the background in the image. The frequency by brightness of the background and the fog droplets in the image converted into the gray scale image has different characteristics. That is, background pixels are high in the frequency of relative low brightness which is almost white, and fog droplet pixels are high in the frequency of relative high brightness which is almost black.

Accordingly, a bimodal distribution is shown as illustrated in FIG. 4, and it shows a frequency difference in brightness between the background pixels and the fog droplet pixels. Therefore, in order to distinguish the fog droplet pixels from the background pixels, a section (brightness) with the minimum frequency between the peaks in the bimodal distribution of FIG. 4 is set as a threshold to classify pixels, the background and the fog droplets in the image can be distinguished.

That is, if the brightness of the gray scale pixel is below the threshold, it is classified as a background pixel and is stored as white (brightness=0), and if the brightness of the pixel exceeds the threshold, it is classified as fog droplet pixel and is stored as black (brightness=255), so the image is binarized as illustrated in FIG. 3C.

The image pixel filtering and masking step is a step of specifying fog droplets by removing noise in the image which may occur in the binarization step and masking the pixels within the optimum radius based on a specific pixel. Specifically, the overlapping number of the binarized fog droplet pixels spaced apart from each other at a predetermined distance is accumulated using the hough circle method, the pixel having the most accumulation number is assumed as the center of a fog droplet, and the optimum radius is determined.

For example, as illustrated in FIG. 5A, a red pixel where circles of the same size from the center of black pixels (nine pixels marked with *) overlap the most is assumed as the center, and the optimum distance is determined while the distance between the pixels is automatically increased from zero to N (real number). In detail, as illustrated in FIG. 5B, a radius including all of the nine pixels (marked with *) by spacing apart from the center at a predetermined distance is determined. In other words, the optimum distance (radius) is determined while increasing the distance, which is spaced apart from the center, from zero to N.

For reference, it is known that fog droplets in the air are in a nearly spherical shape since fog droplets are very small as being in the range of $1/1000$ mm to $1/10$ mm, and are generated under a very static weather condition with low wind velocity.

In this instance, pixels with brightness which is zero (white) may exist in the radius of a fog droplet, and such pixels are masked to have brightness of 255 (black). Therefore, as illustrated in FIG. 5C, the fog droplets may be specified. However, since pixels from which the center of an object cannot be found or single pixel (spot) may be determined as noise, they are filtered by setting the brightness in the image to be zero (white).

The fog droplet detecting step is a step of detecting fog droplets using masked pixels. The above-mentioned steps are repeated to detect fog droplets through the masked pixels. In this way, fog droplets can be detected as illustrated in FIG. 3D.

The step of calculating the size and the number of fog droplets is a step of calculating the radius of the detected fog droplets and the number of fog droplets by each fog droplet size. For instance, if the size per pixel illustrated in FIG. 5C is assumed to be 1 µm, the radius of the fog droplet illustrated in FIG. 5C may be assumed to be 3.5 µm.

For reference, when a standard material of a powder type having a certain size before and after photographing fog is located within a focus area and powder particles are actually measured, the size per pixel can be calculated. That is, if it is shown that the standard material with the diameter of 1 µm when being photographed and appears as a size of 2 pixels, the size per pixel is 0.5 µm.

Furthermore, when the image illustrated in FIG. 3D is analyzed assuming that the pixel size of the image illustrated in FIG. 3A is 1 the number of droplets for the radius of fog droplet can be calculated as illustrated in FIG. 6. In this instance, the number and the interval of bins for the radius of fog droplet may be set arbitrarily.

The step of calculating fog characteristics and generating an image is a step of calculating fog characteristics including a mean radius, an effective radius, a number concentration, an extinction coefficient, visibility by fog, and the like by using the calculated size and number of fog droplets, and generating fog characteristics into time series images whenever fog droplets are observed.

The mean radius among the fog characteristics is calculated through the Equation 1 below.

$$\text{mean radius} = \frac{\sum_{i=1}^{N} r_i}{N} \qquad \text{[Equation 1]}$$

Here, $r_i$ is a radius of each bin per fog droplet, and N is the total number of droplets of each bin.

In addition, the effective radius is calculated through the Equation 2 below.

$$\text{effective radius} = \frac{\sum_{i=1}^{N} n_i r_i^3}{\sum_{i=1}^{N} n_i r_i^2} \qquad \text{[Equation 2]}$$

Here, $n_i$ is the number of droplets of each bin per fog droplet.

Moreover, the number concentration ($c_i$) among the fog characteristics is calculated through the Equation 3 below.

$$c_i = \frac{n_i}{V} \qquad \text{[Equation 3]}$$

Here, $c_i$ is the number concentration of each bin, and V is a volume of a focus, and is calculated by dh (height)×dl (length)×dw (width) of FIG. 2.

Additionally, the liquid water content (LWC) among the fog characteristics is calculated through the Equation 4 below.

$$LWC = \rho \sum_{i=1}^{N} \left(\frac{\pi}{6} c_i r_i^3\right) \qquad \text{[Equation 4]}$$

Here, p is the air density of 1 kg/m².

Furthermore, the extinction coefficient ($\sigma_{ext}$) among the fog characteristics is calculated through the Equation 5 below.

$$\sigma_{ext} = \alpha \times LWC^{-\beta} \qquad \text{[Equation 5]}$$

Here, $\alpha$ and $\beta$ are empirical coefficients according to the fog characteristics, and have values of $65 \leq \alpha \leq 178$ and $0.63 \leq \beta \leq 0.96$ according to Sheikh Muhammad's theorem (Sheikh Muhammad et al, 2010).

Finally, the visibility (Vis) by fog is calculated according to Equation 6 below.

$$Vis = \frac{-\ln(0.05)}{\sigma_{ext}} \qquad \text{[Equation 6]}$$

Since WMO defines a horizontal visibility distance when light is reduced by 5% of the original intensity as visibility by fog, visibility by fog can be calculated using the Equation 6.

Finally, when the fog characteristics are calculated and stored, the fog characteristics whenever fog droplets are observed can be generated as time series images. Therefore, the present invention can identify fog characteristics in real time, and provide weather condition information and relevant services in real time.

As described above, while the present invention has been described with reference to the various embodiments thereof, it will be understood by those of ordinary skill in the art that the preferred embodiments are just to describe the present invention and various modifications or equivalent embodiments are possible from the detailed description of the invention. Therefore, the true scope of the present invention should be determined by the technical spirit of the claims.

What is claimed is:

1. A method for detecting fog particles and calculating fog characteristics based on camera images, comprising:
   a fog image collecting step of adjusting a magnification of a camera and an optical lens to a magnification capable of photographing fog, photographing fog, and storing a photographed image;
   an image conversion step of converting the photographed image into a single color image of a gray scale having the brightness of 0 to 255 and calculating the frequency by each brightness in the gray scale image;
   an image binarization step is a step of classifying and storing pixels based on a threshold to distinguish the fog droplets from the background in the image;
   an image pixel filtering and masking step is a step of specifying fog droplets by removing noise in the image which may occur in the binarization step and masking the pixels within the optimum radius based on a specific pixel;
   a fog droplet detecting step of detecting fog droplets using masked pixels;
   a step of calculating the size and the number of fog droplets of calculating the radius of the detected fog droplets and the number of fog droplets by each fog droplet size; and a step of calculating fog characteristics and generating an image is a step of calculating fog characteristics including a mean radius, an effective radius, a number concentration, an extinction coefficient, visibility by fog, and the like by using the calculated size and number of fog droplets, and generating fog characteristics into time series images whenever fog droplets are observed.

2. The method according to claim 1, wherein when $r_i$ is a radius of each bin per fog droplet and $n_i$ is the number of droplets of each bin per fog droplet, the effective radius is calculated by an equation:

$$\text{effective radius} = \frac{\sum_{i=1}^{N} n_i r_i^3}{\sum_{i=1}^{N} n_i r_i^2}.$$

3. The method according to claim 2, wherein when $n_i$ is the number of droplets of each bin per fog droplet and $V$ is a volume of a focus, the number concentration ($c_i$) per bin is calculated by an equation:

$$c_i = \frac{n_i}{V}.$$

and wherein the liquid water content (LWC) is calculated by an equation:

$$LWC = \rho \sum_{i=1}^{N} \left( \frac{\pi}{6} c_i r_i^3 \right).$$

4. The method according to claim 3, wherein when $\alpha$ and $\beta$ are empirical coefficients according to the fog characteristics, and have values of $65 \leq \alpha \leq 178$ and $0.63 \leq \beta \leq 0.96$, the extinction coefficient ($\sigma_{ext}$) among the fog characteristics is calculated by an equation:

$$\sigma_{ext} = \alpha \times LWC^{-\beta}.$$

5. The method according to claim 3, wherein the visibility (Vis) by fog is calculated by an equation:

$$Vis = \frac{-\ln(0.05)}{\sigma_{ext}}.$$

* * * * *